No. 669,540. Patented Mar. 12, 1901.
T. MILLER.
SHAFT BEARING.
(Application filed July 28, 1900.)
(No Model.)
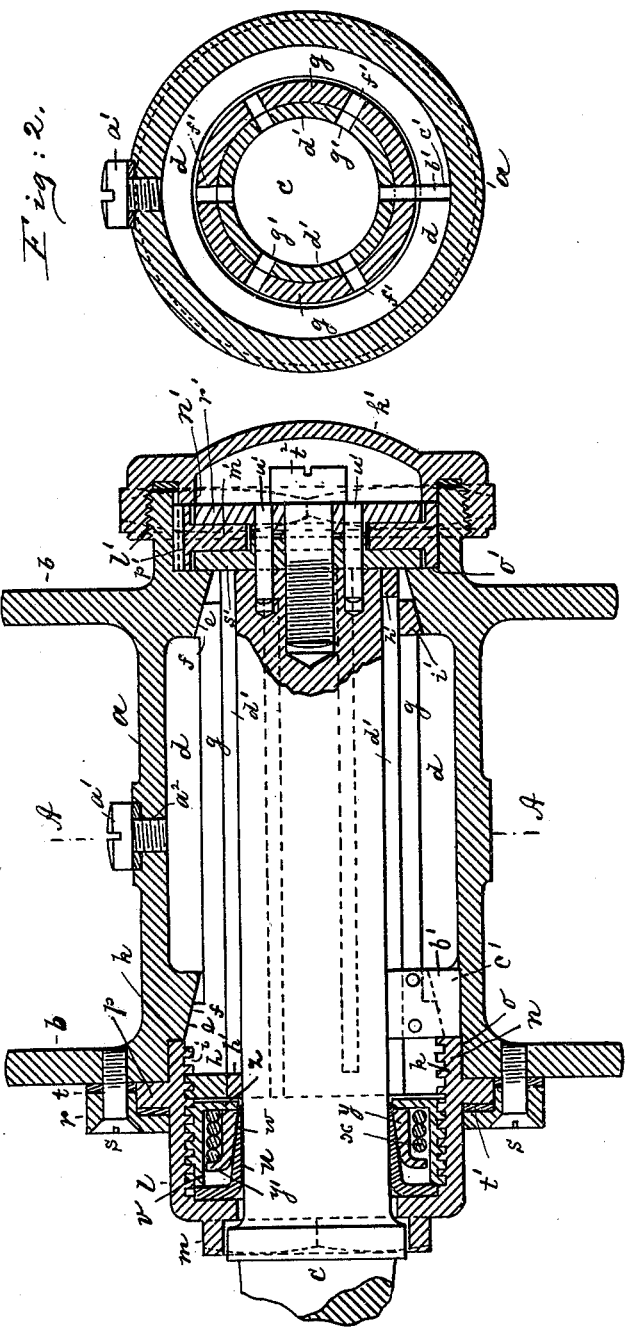

UNITED STATES PATENT OFFICE.

THEODORE MILLER, OF NEW YORK, N. Y.

SHAFT-BEARING.

SPECIFICATION forming part of Letters Patent No. 669,540, dated March 12, 1901.

Application filed July 28, 1900. Serial No. 25,095. (No model.)

*To all whom it may concern:*

Be it known that I, THEODORE MILLER, a citizen of the United States, and a resident of New York city, county and State of New York, have invented certain new and useful Improvements in Shaft and Axle Bearings, of which the following is a specification.

My invention relates to an improvement in bearings for shafts and axles such as are used for power transmission, engines, railroad-axles, the hubs of wagon or bicycle wheels, and particularly for the shafts, wheels, and engines of automobile vehicles.

The main objects of my invention are, first, to make the bearing self-oiling and oil-retaining to such an extent as to require refilling with oil only after a long time; second, to make the bearing perfectly dust and oil proof; third, to make the bearing easily adjustable from the outside without requiring the detachment of any part thereof; fourth, to provide means for compensating for the axial thrust, and, fifth, to arrange the parts subject to wear so as to allow them to be easily removed and renewed at a minimum expense of material and machine-work.

In the accompanying drawings, Figure 1 is a longitudinal section through my bearing, showing part of the shaft or axle in elevation; and Fig. 2 is a section on line A A, Fig. 1.

The body $a$ of my bearing is shown in the form of a hub for a wire-spoked wheel of an automobile vehicle or bicycle, the flanges $b\ b$ serving for the attachment of the wire spokes.

In the arrangement shown the axle or shaft $c$ is designed to be stationary while the wheel-hub turns on it.

The hub or body $a$ has an oil-chamber $d$ surrounding the axle $c$ and is provided with two female cones $e\ e$, into which fit the male cones $f f$ of the outer adjusting-sleeve $g$. The head $h$ of the adjusting-sleeve $g$ has male threads $i$, which mesh with the female threads $k$ of the adjusting-nut $l$, which has a bolt-head $m$ for turning it by means of a wrench. The adjusting-nut $l$ is guided centrally within the hub $a$ by its extension $n$, which fits into recess $o$ of the hub $a$. The annular flange $p$ of the adjusting-nut $l$ is held against the hub $a$ through the recessed ring $r$, which is secured to the hub $a$ by means of screws $s$, so as to allow the turning of the adjusting-nut $l$.

Between the ring $r$ and the hub $a$ are arranged packing-rings $t$ and $t'$, of a soft material, which make an oil and air tight joint between the hub $a$, adjusting-nut $l$, and the ring $r$.

Within the adjusting-nut $l$ is arranged an annular ring $u$, of pliable material, such as leather, which is held fluid-tight on the adjusting-nut $l$ by means of the ring $v$, which is tightened against the packing-ring $u$ by means of the screw-thread on its outer surface, which meshes the threads $k$ of the adjusting-nut $l$. The packing-ring $u$ has a tapering lip $w$, which surrounds the axle or shaft $c$ completely.

Over the tapering lip $w$ of packing-ring $u$ is forced by means of a spring $x$ a ring $y$, which is conical within, so as to conform to the taper of the lip $w$ of the packing-ring $u$. The spring $x$ bears against a flange $y'$ of ring $y$ and also against a flange $z$ of the threaded ring $v$, by means of which it is placed under tension when while putting the parts together the ring $v$ is screwed against the packing-ring $u$. As the spring $x$ by bearing against flange $y'$ forces the taper ring $y$ over the taper lip $w$ of the packing-ring $u$ the latter closes in all around the shaft $c$ and makes a perfectly oil-tight and dust-proof joint.

The hub $a$ is provided with the screw-plug $a'$, closing the opening $a^2$, through which the oil-chamber $d$ may be filled with oil.

The adjusting-sleeve $g$ is prevented from turning within the casing $a$ through a key $b'$, which, however, can slide axially within the keyway $c'$ of the casing $a$.

Within the conical sleeve $g$ is arranged an inner sleeve or cylindrical shell $d'$, surrounding the shaft $c$ and serving as the wearing-sleeve of the bearing. This wearing-sleeve $d'$ is prevented from turning within the adjusting-sleeve $g$ by an extension of the key $b'$.

The adjusting-sleeve $g$ as well as the wearing-sleeve $d'$ are made elastic or adjustable circumferentially by means of slots $f'$ and $g'$, cut staggeringly through their shells, but so as to leave narrow bridges $h'$ and $i'$ for retaining the relative positions of the sections.

On one end the hub $a$ is closed by a cap $k'$, screwed thereon by a thread $l'$. The same end of the hub $a$ is recessed to receive the thrust-ring $m'$, of T shape in cross-section, which is held against axial motion by the projection $n'$ of cap $k'$ and the shoulder $o'$ of the hub $a$, and, further, is prevented from turning within the hub $a$ by a pin $p'$.

To the end of the axle $c$ are secured two end-thrust rings $r'$ $s'$ by means of the cap-screw $t^2$ and the two pins $u'$ $u'$, which latter serve to hold the two thrust-rings $r'$ and $s'$ to the shaft or axle $c$.

When the hub $a$ turns, all the parts, except the two thrust-rings $r'$ and $s'$, turn with it, and the bearing-sleeve $d'$ alone carries the radial thrust of the hub $a$, while the thrust-rings $r'$, $s'$, and $m'$ take up all the axial or end thrust.

Whenever on account of wear the bearing-sleeve $d'$ has become too loose on the shaft $c$, it may be readily taken up by turning the adjusting-nut $l$ by means of a wrench fitting head $m$ thereof.

By turning the adjusting-nut $l$ in one direction the adjusting-sleeve $g$ will move farther toward the end of the shaft $c$, and as it advances within the cones $e\,e$ of the hub $a$ it will close in all around the bearing-sleeve $d'$ and take up all clearances between the latter and the shaft $c$.

As the packing-ring $u$ wears, the conical ring $y$ is forced farther over the lip $w$ of the packing-ring by means of the expansion of the spring $x$, and the tightness of the joint is automatically preserved.

By unscrewing the cap $k'$ the screw $t^2$ may be turned and the thrust-ring $r'$ advanced farther toward the thrust-ring $s'$, so as to reduce any axial clearance of the end-thrust bearing-rings $r'$, $s'$, and $m'$. Further, by removing the three end-thrust rings $r'$, $m'$, and $s'$ the bearing-sleeve $d'$ may be readily withdrawn for examination or for removal.

After the oil-chamber $d$ of the hub $a$ is filled the wearing-sleeve $d'$ and the shaft $c$ are completely surrounded by the lubricant, which has free access to the wearing-surfaces through the slots $f'$ and $g'$ of the adjusting-sleeve $g$ and the wearing-sleeve $d'$.

Having described my invention as applied to the hub of a vehicle-wheel, I do not limit myself to this particular construction, as the invention may be carried out in many other different forms, as is evident to those skilled in the mechanical arts, and without departing from the essence of my invention. For instance, I may use these bearings also for a stationary support for rotating shafts or axles. Further, instead of closing the bearing on one end by a cap I may arrange on that end a spring-forced packing-ring similar to the one shown, so as to allow the shaft to pass entirely through the bearing.

What I claim is—

1. In a bearing, an oil-chamber surrounding the shaft or axle, a packing-ring of soft or pliable material, and a spring-influenced ring for pressing said packing-ring against the shaft or axle, substantially as specified.

2. In a bearing, a cone-seated adjusting-sleeve $g$, an adjusting-nut $l$, engaging said sleeve, and means for securing the adjusting-nut to the bearing so as to admit of its being rotated for the purpose of setting the adjusting-sleeve, substantially as specified.

3. In a bearing, the bearing-sleeve $d'$, slotted axially, the axially-slotted and cone-seated adjusting-sleeve $g$, an oil-chamber surrounding said sleeves, a packing-ring $u$, of soft or pliable material for retaining the lubricant within said oil-chamber, and means for adjusting said sleeves, substantially as specified.

4. In a bearing, an oil-chamber $d$, surrounding the bearing, a packing-ring $u$, of soft or pliable material, a spring-influenced conical ring $y$, that forms a fluid-tight contact between said packing-ring $u$, and the shaft $c$, and means for clamping said packing-ring $u$, against the oil-chamber, substantially as specified.

5. In a bearing, an oil-chamber $d$, surrounding the bearing, a circumferentially-adjustable bearing-sleeve $d'$, a cone-seated adjusting-sleeve $g$, slotted lengthwise, and a packing-ring $u$, of soft or pliable material spring-seated upon the shaft or axle, substantially as specified.

6. In a bearing, an oil-chamber $d$, surrounding the bearing, a spring-seated packing-ring $u$, of soft or pliable material for retaining the lubricant within the oil-chamber, an end-thrust ring secured to the oil-chamber, and an end-thrust ring secured to the shaft, substantially as specified.

7. In a bearing, an oil-chamber $d$, surrounding the bearing, a packing-ring $u$, of soft or pliable material surrounding the shaft, a ring $y$, engaging the packing-ring, and a spring $x$, for forcing said ring $y$, axially against the packing, substantially as specified.

8. In a bearing, the combination of an inner slotted sleeve with a surrounding outer slotted sleeve, a hub, cone-bearings between the outer sleeve and hub, and an adjusting-nut engaging the outer sleeve, substantially as specified.

9. In a bearing, the combination of a hub with a cone-seated slotted sleeve, an intervening oil-chamber, and means for setting the sleeve longitudinally within the hub, substantially as specified.

10. In a bearing, the combination of a hub with a cone-seated slotted outer sleeve, an intervening oil-chamber, a slotted inner sleeve embraced by the outer sleeve, and a nut that engages the outer sleeve and is adapted to set the same longitudinally within the hub, substantially as specified.

11. In a bearing, a flexible tapering packing adapted to engage the shaft or axle, a flanged tapering ring engaging the packing, and a spring which engages the flanged ring and is adapted to slide the same over the packing, substantially as specified.

12. In a bearing, the combination of a hub with an inclosed cone-seated slotted outer sleeve, an intervening oil-chamber, a slotted inner sleeve, a nut that engages the outer sleeve, a threaded ring inclosed by the nut, a tapering flexible packing within the threaded ring, and a spring-influenced tapering ring that engages the packing, substantially as specified.

Signed by me at New York city, county and State of New York, this 27th day of July, 1900.

THEODORE MILLER.

Witnesses:
WILLIAM SCHULZ,
JOHN HICKMAN.